(No Model.)
H. G. EMENS.
PRUNING SAW.
No. 309,448. Patented Dec. 16, 1884.
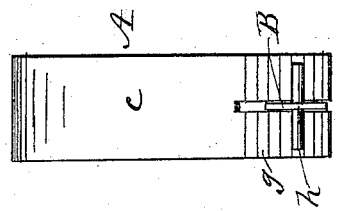
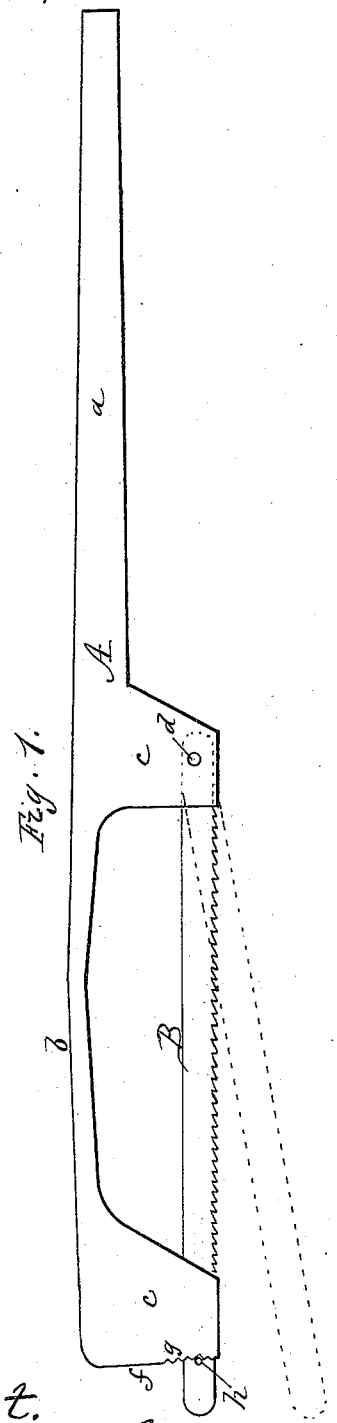
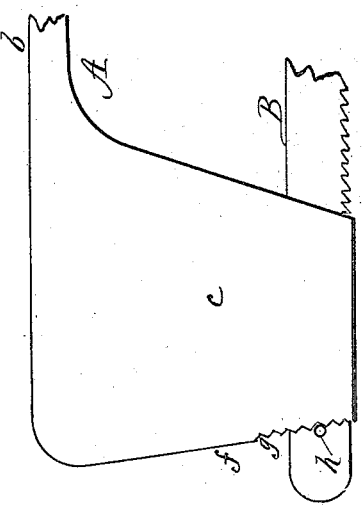
Attest.
Chauncey Perry
Paris Clark
Inventor.
Henry G. Emens,
pr R. L. Osgood,
Atty.

UNITED STATES PATENT OFFICE.

HENRY G. EMENS, OF OGDEN, NEW YORK.

PRUNING-SAW.

SPECIFICATION forming part of Letters Patent No. 309,448, dated December 16, 1884.

Application filed August 21, 1884. (No model.)

*To all whom it may concern:*

Be it known that I, HENRY G. EMENS, of Ogden, in the county of Monroe and State of New York, have invented a certain new and useful Improvement in Pruning-Saws; and I do hereby declare that the following is a full, clear, and exact description of the same, reference being had to the accompanying drawings, in which—

Figure 1 is a side elevation of the device. Fig. 2 is a similar view of one end enlarged. Fig. 3 is a front end elevation.

My improvement relates to devices for pruning trees and shrubs; and it consists, substantially, in the combination of a handle having a spring-back and a beveled front end, and a saw-blade pivoted at its rear end to the handle, its front end having a cross-pin that rides up on the beveled end of the handle to tighten and strain the saw, all as hereinafter described.

In the drawings, A shows the handle, and B the blade. The handle is formed from a single piece of wood, and consists of the handle proper, $a$, and back $b$, the latter being made so thin as to spring easily. The handle is also provided with two downwardly-projecting heads, $c$ $c$, to the rear one of which the rear end of the saw-blade is pivoted at $d$, while the front one is made beveled on the front edge, as shown at $f$. On this beveled front edge are also made a series of cross-corrugations, $g$ $g$, as shown most clearly in Figs. 2 and 3.

The saw-blade, in addition to being pivoted to the handle, as before described, has at its front end a cross-pin, $h$, rigidly secured thereto, which rides up on the beveled front edge of the handle, and engages with the corrugations just described, and thus holds the saw-blade strained and in proper position.

In order to strain the saw, the spring of the handle is bent downward, so as to shorten it, and the beveled front end is brought down, so as to catch the cross-pin on the end of the saw, which cross-pin enters one of the corrugations, and then when the cross-pin is in place the spring is released, which causes the handle to expand, thereby bringing tension on the saw and holding it strained.

Having described my invention, I disclaim a wood-saw in which the blade is strained by a lever which fits in ratchet-teeth at the end of the frame, such as is shown in the reissued patent of J. Haynes, August 25, 1863; but

What I claim as new, and desire to secure by Letters Patent, is—

In a pruning-saw, the combination of the handle A, provided with the spring-back $b$ and beveled front edge $f$, and the saw B, pivoted at its rear end to the handle, its front being provided with a cross-pin, $h$, which rides on the beveled edge to strain the saw, as herein shown and described.

In witness whereof I have hereunto signed my name in the presence of two subscribing witnesses.

HENRY G. EMENS.

Witnesses:
R. F. OSGOOD,
P. A. COSTICH.